(12) United States Patent
Soldani et al.

(10) Patent No.: US 7,206,291 B2
(45) Date of Patent: Apr. 17, 2007

(54) DETERMINATION OF PARAMETER VALUES OF AN UPLINK TRANSPORT CHANNEL

(75) Inventors: David Soldani, Helsinki (FI); Pekka Tapani Kohonen, Espoo (FI)

(73) Assignee: Nokia Corporation, Espoo (FI)

( * ) Notice: Subject to any disclaimer, the term of this patent is extended or adjusted under 35 U.S.C. 154(b) by 747 days.

(21) Appl. No.: 10/415,908

(22) PCT Filed: Sep. 4, 2001

(86) PCT No.: PCT/EP01/10144

§ 371 (c)(1),
(2), (4) Date: Sep. 26, 2003

(87) PCT Pub. No.: WO03/021976

PCT Pub. Date: Mar. 13, 2003

(65) Prior Publication Data

US 2005/0099957 A1    May 12, 2005

(51) Int. Cl.
*H04B 7/216* (2006.01)

(52) U.S. Cl. ...................... 370/252; 370/335; 370/342; 355/522

(58) Field of Classification Search ................ 370/252, 370/335, 342; 455/522, 226.1, 226.2, 226.3, 455/501, 114.2
See application file for complete search history.

(56) References Cited

U.S. PATENT DOCUMENTS

| | | | |
|---|---|---|---|
| 6,493,564 B2 * | 12/2002 | Longoni et al. ............. 455/522 |
| 6,724,742 B1 * | 4/2004 | Mun et al. .................. 370/335 |
| 6,785,321 B1 * | 8/2004 | Yang et al. .................. 375/137 |
| 6,832,095 B2 * | 12/2004 | Haim ......................... 455/522 |
| 6,914,932 B1 * | 7/2005 | Miya et al. .................. 375/150 |
| 2002/0173331 A1 * | 11/2002 | Noh ............................ 455/522 |

OTHER PUBLICATIONS

"Technical specification group radio access network; Physical channels and mapping of transport channels onto physical channels (FDD)", 3rd Generation Partnership Project, TS 25.211, vol. 3.7.0, Jun.

Technical specification group radio access network; Multiplexing and channel coding (FDD), 3rd Generation Partnership Project, TS 25.212, vol. 3.4.0, Sep. 2000, XP002902458 (Release.

* cited by examiner

*Primary Examiner*—CongVan Tran
(74) *Attorney, Agent, or Firm*—Foley & Lardner LLP

(57) ABSTRACT

A method and a network element for determining cell-based values of a parameter of a selected active uplink transport channel multiplexed with other transport channels to a dedicated physical channel. It is proposed that a value for the parameter of the selected uplink transport channel is computed in predetermined periods of time based on the value of at least one available parameter associated to the dedicated physical channel. Further it is determined for the predetermined periods of time for each of the transport channels whether it is active in the respective period of time. Those periods of time for which it was determined that any other than the selected transport channel was active are excluded from supplying a relevant value for the parameter of the selected active uplink transport channel.

18 Claims, 4 Drawing Sheets

DETERMINATION OF PARAMETER VALUES OF AN UPLINK TRANSPORT CHANNEL

FIELD OF THE INVENTION

The invention relates to a method for determining cell based values varying in time of a parameter associated to a selected active uplink transport channel multiplexed with at least one other transport channel to a dedicated physical channel. The invention equally relates to a corresponding network element, communications network and communications system.

BACKGROUND OF THE INVENTION

It is known to multiplex several uplink transport channels onto a dedicated physical channel for transmission in order to enable an effective use of available resources.

The technical specification 3GPP TS 25.211 V3.7.0: "3rd Generation Partnership Project; Technical Specification Group Radio Access Network; Physical channels and mapping of transport channels onto physical channels (FDD) (Release 1999)" describes for example a multiplexing of Layer 1 transport channels onto physicals channels in the FDD (frequency division duplex) mode of the universal mobile telecommunications system (UMTS) terrestrial radio access (UTRA).

According to this specification, a transport channel (TrCH) is defined by how and with what characteristics data is transferred over the air interface. Dedicated transport channels are referred to by dedicated channel (DCH). Physical channels are furthermore defined by a specific carrier frequency, a channelization code and, on the uplink, a relative phase.

During an Radio Resource Control (RRC) connection several TrCHs may be multiplexed in the uplink by a terminal onto one code composite transport channel (CCTrCH), which is subsequently mapped to the data part of a dedicated physical channel (DPCH). This is illustrated by FIG. 1, which corresponds to a figure in the Technical Specification 3GPP TS 25.212 V3.4.0: "3rd Generation Partnership Project; Technical Specification Group Radio Access Network; Multiplexing and channel coding (FDD) (Release 1999)".

As shown in FIG. 1, data provided by the MAC (Medium Access Control) and higher layers arrives at the coding/multiplexing unit 11 in form of a transport block sets on a transport channel TrCH#1 once every transmission time interval (TTI). The TTI is transport channel specific and can take one of the values 10 ms, 20 ms, 40 ms and 80 ms. First, different processing steps are applied to the transport block sets of each transport channel TrCH#1 separately, beginning with adding cyclic redundancy check (CRC) bits to each block 12 and terminating with rate matching 13. The processing steps applied to different transport channels are indicated in FIG. 1 by rectangles 14 grouping these steps. Afterwards, different TrCHs are multiplexed to a single CCTrCH 15. The CCTrCH is mapped after further processing onto a physical channel PhCH#1 16. The physical channel then undergoes spreading, scrambling and modulation. In case of multicode, the same applies to the other physical channels, denoted PhCH#2 etc. in the figure. For the details of the processing steps, which are depicted in FIG. 1 for one transport channel TrCH#1 and for the CCTrCH, it is referred to the cited specification TS 25.212.

The DPCH onto which the CCTrCHs is mapped consists of a dedicated physical control channel (DPCCH) and one or more dedicated physical data channels (DPDCH). The DPDCHs comprise the user data of the TrCHs. For the different DPDCHs different spreading codes are used, which enables a simultaneous WCDMA (Wideband Code Division Multiple Access) transmission. The DPCCH comprises predefined pilot bits to support channel estimation for coherent detection, transmit power control (TPC) commands and a transport format combination indicator (TFCI). DPCCH and DPDCHs are I/Q multiplexed within each radio frame with complex scrambling.

In the uplink, the multi-code operation is possible, if the bit rate of the CCTrCH exceeds the maximum bit-rate of the uplink DPDCH and the maximum allowed amount of puncturing has already been applied. In this case, a spreading factor (SF) equal to 4 has then to be used for the different codes and up to 6 parallel DPDCHs can be used, while only one DPCCH per connection is possible.

When the connection is set up, the terminal is given the minimum allowed SF of the uplink channelisation code for the data part and the variable rate is handled in a dynamic rate matching by changing the DPDCH bit rate (SF) frame by frame or by repeating or puncturing the code bits to achieve the total physical channel bit rate. In the uplink direction repetition is preferred. Puncturing is used to avoid multicode transmission or when facing the limitations of the User equipment transmitter or Node B receiver.

The relative power level is set such that for higher bit rates the power of the DPCCH is higher, thus enabling a more accurate channel estimation, and the overhead, i.e. DPDCH vs. DPCCH power, of the DPCCH is still lower.

Since several TrCHs may be multiplexed onto one CCTrCH, and since the quality, and in particular the Eb/No (bit energy per noise interference) requirements can be different in each transport channel, a rate-matching attribute is introduced for each TrCH, which is used in balancing the Eb/No values of the radio connection for a static or service specific rate matching.

According to the specification TS 25.212, higher layers assign a rate-matching attribute for each transport channel. The rate-matching attribute is used to calculate a rate matching value when multiplexing several TrCHs for the same frame. The attribute is semi-static and can only be changed through higher layer signaling. By adjusting the rate-matching attribute, an admission control (AC) is thus able to fine-tune the quality of different bearer services in order to reach an equal or near equal symbol power level requirement. Success of the static rate matching depends on, e.g., how correct the Eb/No value is in respect to the quality—e.g. BLER—target.

With the aid of the rate matching attribute and the TFCI of the DPCCH, the receiver can calculate backwards the rate matching parameters used and perform the inverse operation.

Static and dynamic rate matchings 13 are done simultaneously, they are also indicated in FIG. 1.

Neither the Eb/No nor the quality of any TrCH set up during the same RRC connection is available from the conventional implementations.

In order to overcome the effect of the possible incomplete static rate matching in the measured quantities, it would be an advantage, if uplink connection based measurements could be carried out for each bearer service or TrCH multiplexed onto one CCTrCH.

Eb/No is also in general a key figure for receiver performance and can be employed for a variety of functions, as well in controlling as in evaluation. Moreover, other parameters associated to specific TrCHs, in particular quality parameters like BER (Bit Error Rate) and/or BLER (Block Error Rate), can be of interest, which parameters are only available for entire DPCHs in the current implementations.

SUMMARY OF THE INVENTION

It is an object of the invention to enable the determination of cell based values for a parameter associated to a selected transport channel multiplexed with other transport channels to a dedicated physical channel.

The object is reached on the one hand with a method for determining cell based values varying in time of at least one parameter of a selected active uplink transport channel multiplexed with other transport channels to dedicated physical channel. The method comprises at a unit receiving the uplink transport channels computing in predetermined periods of time a value for the at least one parameter of the selected uplink transport channel based on at least one available parameter associated to the dedicated physical channel. The at least one available parameter is influenced by signals transmitted on all active transport channels multiplexed to the dedicated physical channel. Moreover, it is determined for the predetermined periods of time for each of the transport channels whether it is active in the respective period of time. Those periods of time for which it was determined that any other than the selected transport channel was active is excluded from supplying a relevant value for the at least one parameter of the selected active uplink transport channel.

On the other hand, the object is reached with a network element for a communications network comprising means for determining cell based values varying in time of at least one parameter of a selected active uplink transport channel multiplexed with other transport channels to a dedicated physical channel according to the proposed method. The object is equally reached with a communications network and with a communications system comprising such a network element.

The invention proceeds from the idea that even if several transport channels are multiplexed to a dedicated physical channel, only the respective active transport channels are able to influence a parameter which is determined for the entire dedicated physical channel. Inactive transport channels are in particular transport channels currently used for downlink transmissions. Therefore it is proposed to control the activity of all transport channels multiplexed to the considered dedicated physical channel. Thereby, it is known for respective periods of time if available parameter values associated to the dedicated physical channel are only influenced by a selected one of the transport channels. Only these parameter values are then accepted as basis for determining the desired transport channel specific parameter values. This means, in case other transport channels than the selected transport channel were active during a period of time, transport channel specific parameter values are either not determined in the first place for this period, or transport channel specific parameter values are determined but then discarded.

The invention thus allows uplink connection based measurements for each bearer service multiplexed onto dedicated physical channel.

Preferred embodiments of the invention become apparent from the subclaims.

The at least one parameter of an active first uplink transport channel can comprise in particular the Eb/No, the BLER or FER (Frame Error Rate) if TTI=10 ms, and/or the BER of the selected active uplink transport channel. In the determination of these transport channel specific values the effect of possible incomplete static rate matching can be overcome.

For determining Eb/No values, preferably a target SIR is used as at least one available parameter associated to the dedicated physical channel. This target SIR can be determined proceeding from a predetermined value and be changed according to requests for each of the uplink transport channels multiplexed to the dedicated physical channel.

The BLER of a selected TrCH mapped onto a dedicated physical channel to which a plurality of transport channels are multiplexed can be calculated in particular from the number of CRCs comprising an error put into relation to the total number of CRCs in one period of time.

The BER of a selected TrCH mapped onto a dedicated physical channel to which a plurality of transport channels are multiplexed can be calculated in particular based on the average Quality Estimate (QE) in one period of time.

In a preferred embodiment of the invention, the values for the at least one parameter are determined separately for each of the uplink transport channels multiplexed to the dedicated physical channel.

The respective values channel can be determined in particular for each desired parameter and each desired transport channel as average values in each period of time. In addition, the respective values of the at least one parameter can be subjected to a sliding average within a predetermined sliding window.

Advantageously, the determined values for the at least one parameter are stored in a data base, so they are available for further use.

The transport channels can be multiplexed to a CCTrCH that is mapped to a single DPDCH of a DPCH. The invention can also be employed in case of multicode transmissions, i.e. when the CCTrCH is mapped onto several DPDCHs of said DPCH. As mentioned above, there may be zero, one, or several uplink DPDCHs on each DPCH, but there is always exactly one uplink DPCCH.

If the invention is employed for UTRAN (UMTS Terrestrial Radio Access Network), the at least one parameter of an active first uplink transport channel is advantageously determined in an uplink outer loop power control controller of a radio network controller (RNC) of the UTRAN. The activity of each transport channel mapped onto dedicated physical channel can further be controlled in a dedicated uplink outer loop power control entity of such an RNC. The uplink outer loop power control entities can then provide for each of the periods of time an indication whether the respective transport channel was active during this period of time to the uplink outer loop power control controller.

In a preferred embodiment of the invention, cell based values of at least one parameter of respective selected active uplink transport channels are determined cell by cell for a selected group of cells, in particular for cells involved in a diversity handover. For each cell, the values are determined in the unit receiving the respective uplink transport channel. A central unit, e.g. a mobile connection control (MCC) unit, is used for controlling said cell by cell determination of cell based values in various receiving units. This central unit can moreover collect all determined cell based values. The invention thus allows cell by cell uplink connection based measurements for each bearer service multiplexed onto dedicated physical channel.

Values of parameters determined according to the invention can be employed for a variety of purposes. Eb/No values determined according to the invention can be employed for instance for uplink connections based performance analysis and the implementation of other features, like uplink outer loop power control statistics, auto-tuning of uplink Eb/No, RAN trace etc. Further examples of an application of the invention are radio resource management, radio network dimensioning, radio network planning, radio network management and troubleshooting.

The invention can be employed advantageously, though not exclusively, for WCDMA, in particular UTRA FDD.

BRIEF DESCRIPTION OF THE FIGURES

In the following, the invention is explained in more detail with reference to drawings, of which

DETAILED DESCRIPTION OF THE INVENTION

Figure 1:
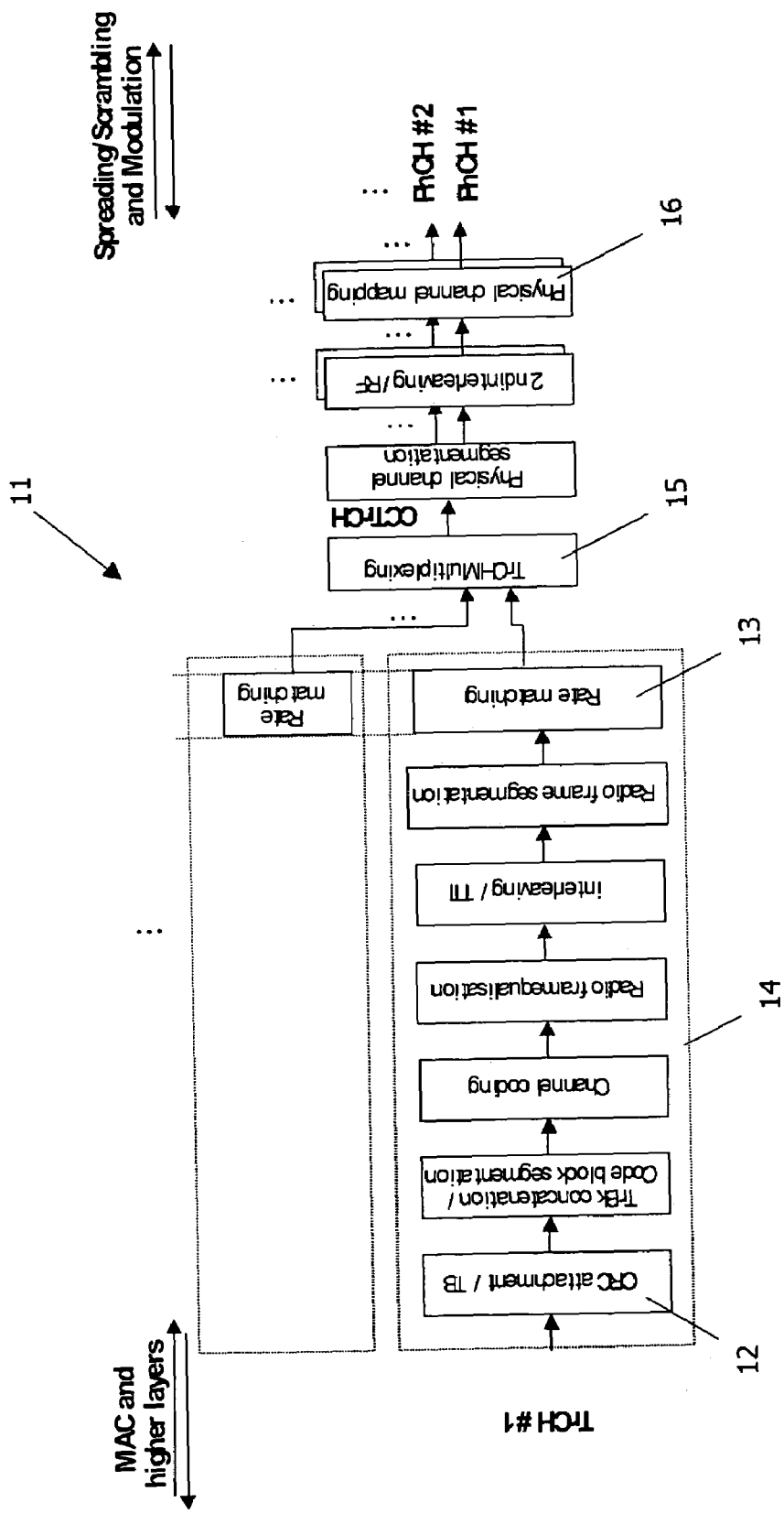
FIG. 1 illustrates uplink transport channel encoding and multiplexing.

An embodiment of the invention will be presented, in which Eb/No, BER and/or BLER values of selected uplink transport channels are determined, which uplink transport channels are mapped to a dedicated physical channel as described above with reference to FIG. 1. The physical channels are employed in this embodiment in a telecommunications system for transmissions between terminals and a WCDMA node B of an UTRAN. The embodiment proceeds from a conventional outer loop power control in an UTRAN RNC for determining the desired parameter values.

Figure 2:
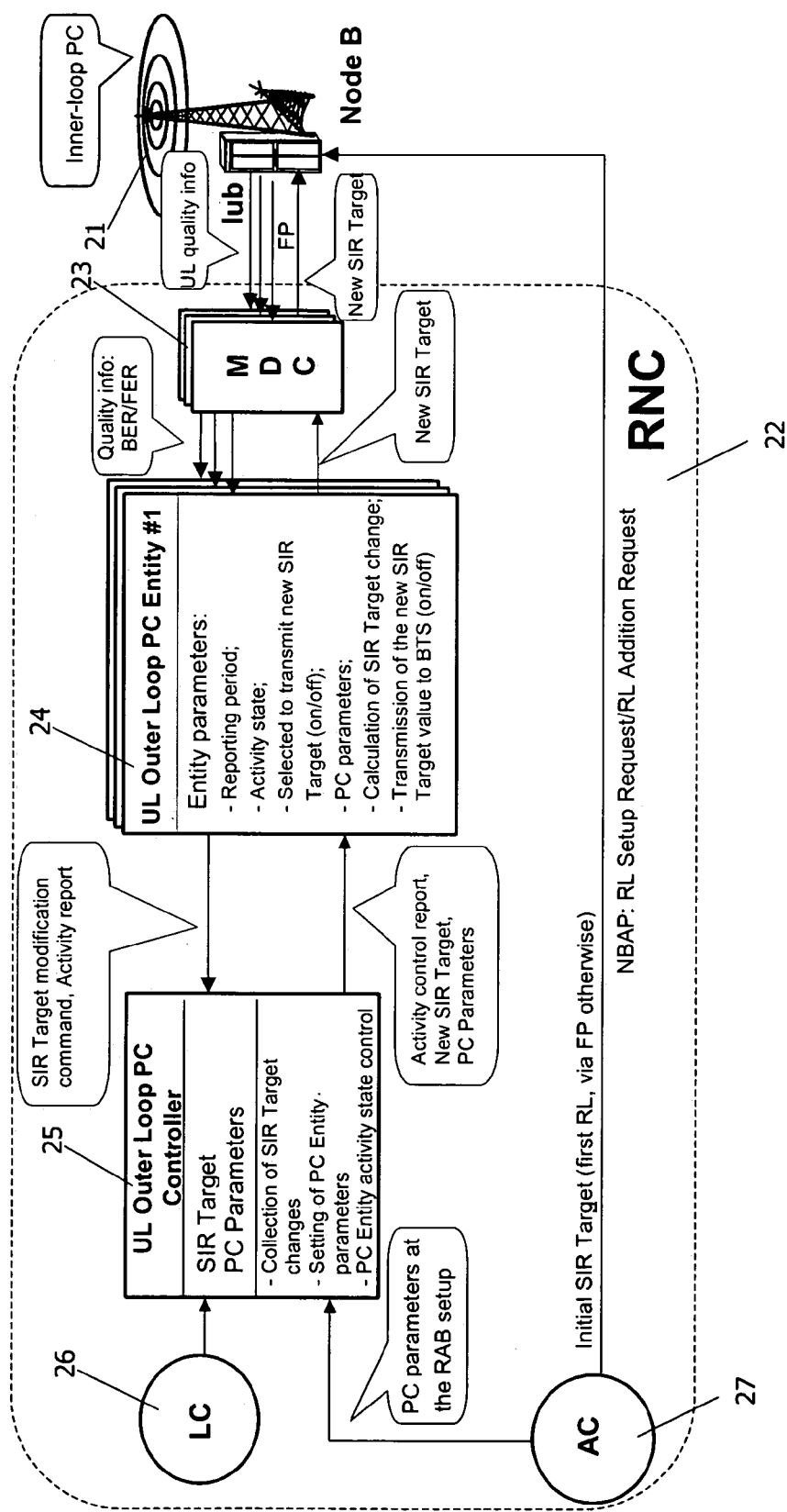
FIG. 2 shows a logical architecture of an uplink outer loop PC algorithm employed in an embodiment of the invention.

FIG. 2 shows elements of the UTRAN involved in determining the parameter values. A WCDMA node B 21 enables on the one hand a radio connection of the UTRAN to terminals (not shown). On the other hand, it is connected to an RNC 22 of the UTRAN. Part of this RNC 22 is a conventional logical architecture of an uplink outer loop PC algorithm, which is illustrated in FIG. 2.

In the RNC 22, a macro diversity combiner (MDC) 23 is provided for each bearer service within a single RRC connection. The MDCs 23 enables the connection of the node B 21 with the RNC 22 via an Iub interface. Each MDC 23 is moreover connected within the RNC 22 with a dedicated uplink outer loop power control (OLPC) entity 24 provided for the same data channel as the respective MDC 23. The OLPC entities 24 are further bi-directionally connected to an uplink (OLPC) controller 25 provided for one RRC connection. This OLPC controller 25 receives in addition input from a load control LC function 26 and from an admission control AC function 27. The AC 27 has in addition a direct access to the node B 21.

At the setup of the radio access bearer RAB, the AC 27 computes an initial target SIR after rate-matching when multiplexing several TrCHs for the same frame. The AC 27 provides the node B 21 directly with this computed initial SIR target value for transmission to the respective terminal. Additionally, the AC 27 provides the uplink OLPC controller 25 with the initial target SIR and with other configuration parameters. A part of these parameters is then forwarded by the OLPC controller 25 to the OLPC entities 24.

The MDCs 23 receive uplink quality information from the node B 21 and combine the incoming data from different SHO (soft handover) branches in a selection and combining procedure. Each uplink OLPC entity 24 then receives the processed uplink quality information from the associated MDC 23. This quality information includes, depending on the type of the radio bearer, either a BLER estimate computed in the MDCs 23 based on the CRC-bits of the selected frame, and/or a BER estimate calculated in the WCDMA node B 21. If the CRC is not correct (NOK), the respective MDC 23 selects the best one of the BER estimates. Each OLPC entity 24 calculates for the respective channel a required change in the target SIR according to the received uplink quality information and provides the calculated required change to the OLPC controller 25 up to once each TTI. Equally provided to the OLPC controller 25 is an activity report for each reporting periods. The extend of a reporting period is provided as one of the parameters from the AC 27 via the OLPC controller 25.

Based on the current target SIR and the different change requests, the OLPC controller 25 computes a new target SIR. The new target SIR is reported together with PC parameters to the OLPC entities 24. One of the entities 24, in particular an entity assigned to a signaling link or to a dedicated control channel DCCH, is selected to transmit the new target SIR via the respective MDC 23 to the node B 21. For interactions between the RNC 22 and the node B 21, the DCH frame protocol is used.

Figure 3:
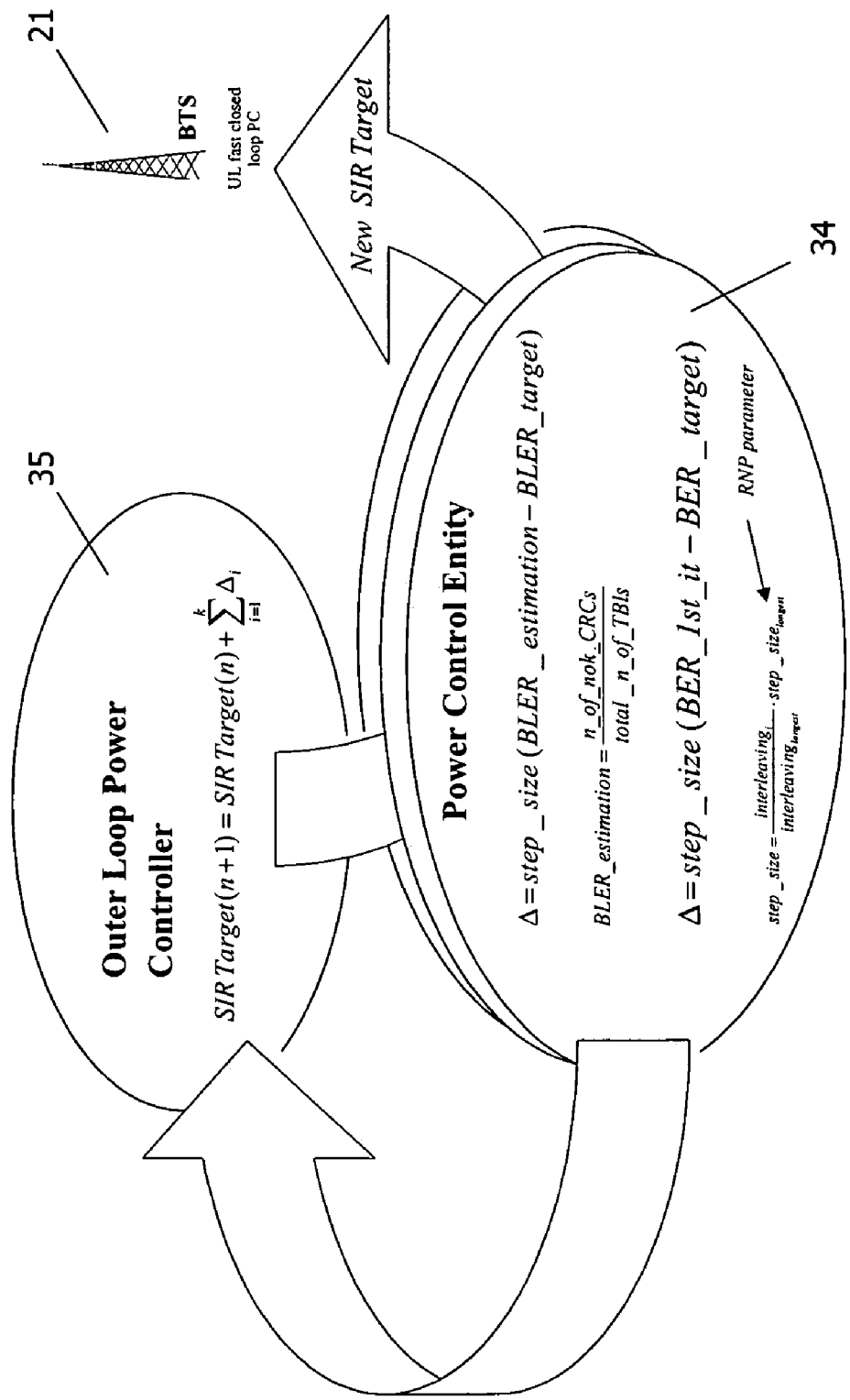
FIG. 3 illustrates a conventional uplink power control algorithm.

FIG. 3 illustrates in more detail an algorithm that can be used by OLPC controller 25 and OLPC entities 24 for determining a new target SIR. First ellipses 34 indicate the calculations carried out by the OLPC entities 24, and a second ellipse 35 indicates the calculations carried out by the OLPC controller 25.

Each active or semi active OLPC entity 23 may contribute with a change request to the new SIR target computation in any TTI, provided that the requested change is greater than 0.1 dB. The respective desired change $\Delta$ is calculated either based on a BLER or a BER estimate provided by the respective MDC 23. When based on a BLER estimate, the desired change is calculated as the difference between the received BLER estimate and a target BLER, multiplied by a step size. The BLER estimate is calculated as the quotient of the number of CRCs which are not OK (CRC NOK) and the sum of the CRCs which are OK (CRC OK) and of the CRCs which are not OK, which sum corresponds to the number of transport blocks on a transport block set (TBS). When based on a BER estimate, the desired change is calculated as the difference between a received BER estimate of a first itineration and a target BER, multiplied by a step size. The step size is set by radio network planning (RNP) and corrected by each entity 24 considering the interleaving depth of the respective transport channel.

The OLPC controller 25 receives the changes requested by each OLPC entity 24, and determines which requests are allowed to contribute to the new target SIR. The new target SIR is then calculated by the OLPC controller 25 as the old SIR target plus the sum over all valid requested changes. In the corresponding equation included in the second ellipse 35 in FIG. 3, k is the number of OLPC entities 24 contributing to the new SIR target computation, i.e. the number of all active and semi-active entities allowed to send a request for a change of the SIR to the OLPC controller 25. The first old SIR target after a RAB setup is the initial SIR target received from the AC 27.

The new SIR target is then forwarded to BTS (base transceiver station) or node B 21 via one of the OLPC entities 24 as mentioned with reference FIG. 2.

The desired Eb/No for each transport channel can now be put into relation to the determined target SIR according to the following considerations.

The node B 21 detects physical channel pilot symbols and estimates the SIR per symbol on the DPCCH in correspondence with the technical specification 3GPP TS 25.215 V3.4.0 (2001-06) 3rd Generation Partnership Project; Technical Specification Group Radio Access Network; Physical layer—Measurements (FDD) (Release 1999)" as:

$$SIR_{DPCCH}^{Est} = G_{DPCCH} \frac{RSCP_{DPCCH}}{ISCP}$$

with $G_{DPCCH} = W/R_{DPCCH}$, where $R_{DPCCH}$ is the bit rate of the DPCCH, W the chip rate, $RSCP_{DPCCH}$ is the received signal code power on the DPCCH, and with ISCP being the uplink interference signal code power.

Assuming now only one DCH per connection, and considering that the corresponding CCTrCH is going to be mapped to N DPDCH's (N=1, 2, . . . ) the total received code power on the DPDCH's is:

$$N_{eff} \cdot RSCP_{DPDCH} = Eb_{DCH} \cdot R_{DCH}^{C} \cdot N_{eff} \cdot R_{DPDCH} = Eb_{DCH} \cdot R_{DCH}^{user}$$

This equality is a result of the dynamic rate matching. In the equation, $R_{DCH}^{C}$ is the encoding rate of the DCH and $RD_{PDCH}$ is the bit rate of the DPDCH. $RSCP_{DPDCH}$ is the received signal code power on a DPDCH, $R_{DCH}^{user}$ is the DCH user bit rate for which the Eb/No is desired and $Eb_{DCH}$ is the bit energy. $N_{eff}$ is obtained from the number of the employed DPDCH's N by:

$$N_{eff} = N + \frac{RSCP_{DPCCH}}{RSCP_{DPDCH}},$$

where $RSCP_{DPCCH}$ and $RSCP_{DPDCH}$ is the received signal code power on the DPCCH and on one DPDCH, respectively. Using the parameter $N_{eff}$, the Eb/No can comprise the overhead of the DPCCH as well. For Eb/No measurements which relate only to the DPDCHs, $RSCP_{DPCCH}$ can be set to 0 so that $N_{eff}$ equals to N.

Based on this observation, and the fact that ISCP=W·No, the SIR estimate by the node B can be reformulated as follows:

$$SIR_{DPCCH}^{Est} = G_{DPCCH} \frac{RSCP_{DPCCH} \cdot RSCP_{DPDCH}}{RSCP_{DPDCH} \cdot ISCP}$$

$$= EbNo_{DCH} \frac{R_{DCH}^{user}}{N_{eff} \cdot R_{DPDCH}} \frac{RSCP_{DPCCH}}{RSCP_{DPDCH}} \frac{R_{DPDCH}}{R_{DPCCH}}$$

This leads to the conclusion that when during the current RRC connection either only one DCH is mapped onto the DPDCH, or only a specific bearer service is active, i.e. all other bearer services are not in uplink transmission, the actual target SIR in dB reduces to:

$$SIR_{Actual}^{UL,DPCCH} = EbNo_{DCH} + 10 \cdot \log\left(\frac{R_{DCH}^{user}}{N_{eff} \cdot R_{DPDCH}}\right) +$$

$$= 20 \cdot \log\left(\frac{\beta_c^{TFC_{Max}}}{\beta_d^{TFC_{Max}}}\right) + 10 \cdot \log\left(\frac{SF_{DPCCH}}{SF_{DPDCH}}\right) \text{ and}$$

$$N_{eff} = N + \frac{RSCP_{DPCCH}}{RSCP_{DPDCH}}$$

$$= N + \left(\frac{\beta_c^{TFC_{Max}}}{\beta_d^{TFC_{Max}}}\right)^2.$$

In the last but one equation, the terms on the right hand side denote from left to right the desired Eb/No of the DCH in question, the Coding Gain, the Gain Factors Gain, and the SF gain of the radio connection after channel coding.

The target SIR, however, can be affected by the semi-active OLPC entities 24 and static rate matching attributes when the associated inactive DCH is mapped onto the same uplink BPDCH as the selected active DCH. This is illustrated in FIG. 4 for one active OLPC entity and one semi-active OLPC entity.

Figure 4:
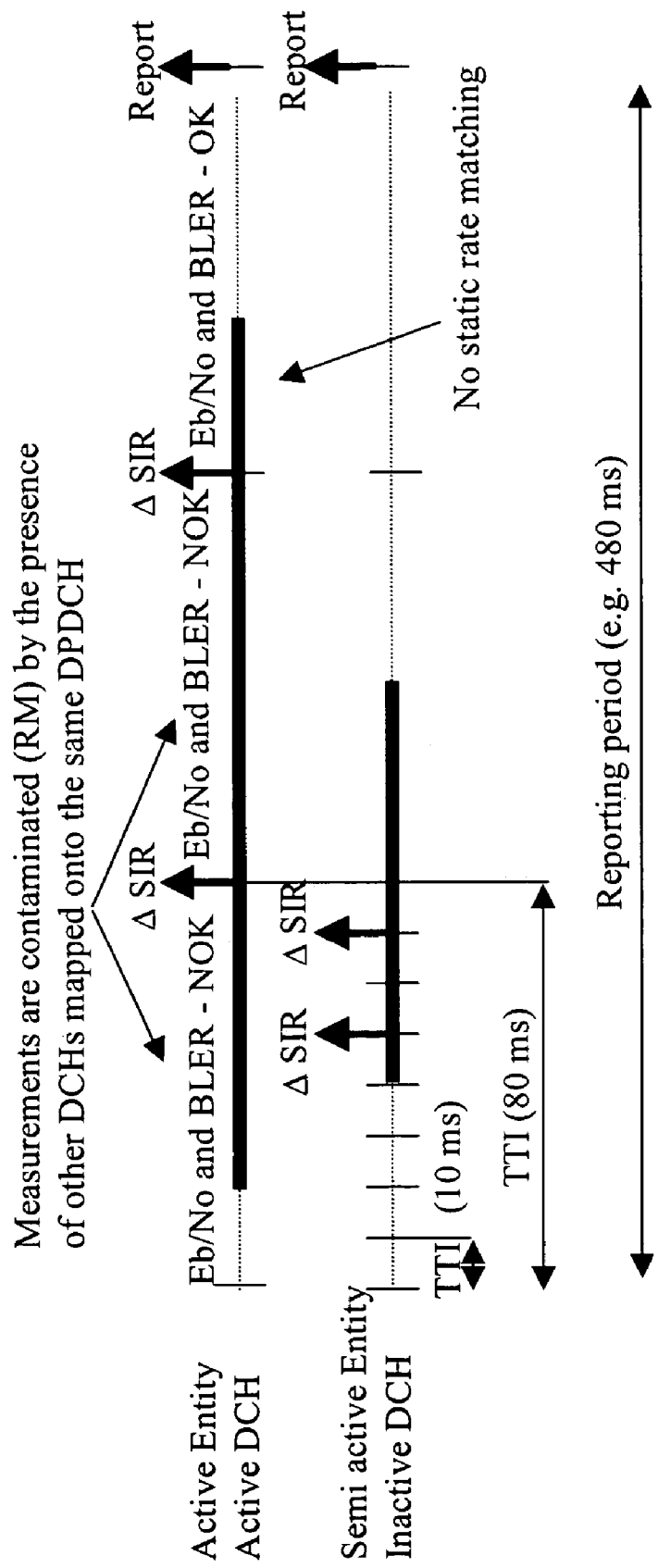
FIG. 4 illustrates the influence of other DCHs on the Eb/No measurements for one DCH.

In FIG. 4, a first, upper time line is associated to a selected active DCH and the corresponding active OLPC entity. This entity has TTIs of e.g. 80 ms. A second, lower time line is associated to a semi active entity associated to an inactive DCH. The second entity has TTIs of e.g. 10 ms. Both time lines have the length of one complete reporting period of e.g. 480 ms. The reporting period is a radio network planning (RNP) parameter. At the end of the respective time line, both entities send an activity report to the OLPC controller 25.

As mentioned above, each active or semi-active entity 24 is allowed to send each TTI a request for a change of the current SIR to the OLPC controller 25. In the presented example, the active entity sends a change request after the first and the second TTI, and the semi active entity sends a change request after the 5$^{th}$ and the 7$^{th}$ TTI, each request being indicated in the figure as Δ SIR. Thus the target SIR, which is computed by the OLPC controller 25 from all received valid requests, can be affected by the semi active entity and static rate matching attributes when the inactive DCH is mapped onto the same uplink DPDCH as the active DCH.

Equally, the quality estimates BER and/or BLER can be affected by such semi active entities.

Thus, in order to be able to calculate transport channel specific parameter values from determined target SIR or from determined quality estimates, it has to be known whether the respective SIR or the respective quality estimates are influenced by the presence of other transport channels. According to the presented embodiment of the invention, the uplink OLPC controller 25 is informed whether a transport channel has experienced any traffic or not in a reporting period by a corresponding indication in the activity report, which is sent to the OLPC controller 25 by the OLPC entity 24 associated to the transport channel each reporting period.

Since the static rate matching does not affect the computation when only the wanted bearer service is active, all other bearer services being in DTX, the Eb/No of the transport channel can be estimated for such times from the previous equation as follows:

$$EbNo_{DCH} = SIR_{Actual}^{UL,DPCCH} - 10 \cdot \log\left(\frac{R_{DCH}^{user}}{N_{eff} \cdot R_{DPDCH}}\right) -$$
$$20 \cdot \log\left(\frac{\beta_c^{TFC_{Max}}}{\beta_d^{TFC_{Max}}}\right) - 10 \cdot \log\left(\frac{SF_{DPCCH}}{SF_{DPDCH}}\right),$$

which can be reduced to:

$$EbNo_{DCH} = SIR_{Actual}^{UL,DPCCH} - 10 \cdot \log\left(\frac{R_{DCH}^{user}}{N \cdot R_{DPDCH}}\right) -$$
$$20 \cdot \log\left(\frac{\beta_c^{TFC_{Max}}}{\beta_d^{TFC_{Max}}}\right) - 10 \cdot \log\left(\frac{SF_{DPCCH}}{SF_{DPDCH}}\right)$$

if the Eb/No does not comprise the overhead introduced by the DPCCH, i.e. $N_{eff}=N$.

For solving this equation, it is assumed that $$\beta_c^{TFC_{Max}}, \beta_d^{TFC_{Max}},$$

$R_{DPDCH}$ and $SF_{DPDCH}$ are produced by the AC 27 considering all other bearer services than the currently selected bearer service to be not in uplink transmission (DTX mode) and the maximum bit rate of the transport channel to be used, which is assumed to be $MAX_{DCH}\{TFS_{DCH}\}$, TFS being the transport format set.

In order to be able to determine for each transport channel a Eb/No value and quality parameter values, a set of parameters provided by the AC 27 to the OLPC controller 25 and a set of parameters provided by the OLPC entities 24 to the OLPC controller 25 are defined for the presented embodiment of the invention.

At the RAB setup, after static rate matching, i.e. Eb/No balancing, the uplink OLPC controller 25 receives from the AC 27 on the one hand radio link specific parameters and on the other hand DCH specific parameters.

The radio link specific parameters comprise as one parameter a counters update period. This parameter is needed for online and/or trace and must be set as an integer number of activity reporting periods of the uplink OLPC entities 24. It can be set in a range of 1 to 1000 reporting periods, e.g. to 100 reporting periods. A further parameter is the size of an EbNo Sliding Window, e.g. 20 reporting periods. This parameter is used for averaged Eb/No computations and should lie equally in a rage of 1 to 1000 reporting periods.

The last radio link specific parameter is an online and/or trace parameter, which can be set to 'Y' or 'N'.

DCH specific parameters comprise an enable measurements parameter, which can be used to enable the measurements traffic class based. Further comprised are a coding gain in dB, a gain factors gain in dB and an SF gain in dB, each gain for the case that only the currently regarded transport channel is active, i.e. all others are in DTX, and that the maximum bit rate, i.e. $MAX_{DCH}\{TFS_{DCH}\}$, is used. Another parameter is the traffic class which is defined based on the RAB attributes. Further a quality target for BLER and/or BER is given. Equally, the size of a BLER sliding window and/or the size of a BER sliding window are provided, the BER sliding window however only if turbo coding is used. Both can be set e.g. to 20 in terms of reporting periods. Both can be selected again from a range of 1 to 1000 reporting periods.

During the RRC connection, the measurements are started and stopped by the Mobile Connection Control (MCC) unit using a separate message, which allows cell based measurements.

Based on the parameters the OLPC entity 24 receives from the uplink OLPC controller 25 when it is set up, it sends an activity report to the controller 25 once every reporting period. As already mentioned, the reporting period is one of several RNP parameters that each OLPC entity 24 receives during setup by the uplink OLPC controller 25. The reporting period ranges from 80 ms up to 2400 ms in steps of 80 ms.

The default value is 480 ms, as in FIG. 4. The activity report comprises the sum of the SIR target changes during the DTX-off periods. It further comprises the DTX state of the controlled bearer, which can be 'on' or 'off'. Moreover, a DTX indicator is provided, which is used to inform the OLPC controller 25 whether the DCH associated to the respective OLPC entity 24 has been active or not during the terminated reporting period. In addition, the number of CRC OK and the number of CRC NOK after selection and combining during the reporting period are provided in the activity report. The sum of the QEs, after selection and combining, divided by the number of DCH-FP (Frame Protocol) instances, received during the reporting period, are equally included in the activity report. Finally, a connection frame number CFN is used as a time stamp for measurement synchronisation.

With the information of the AC 27 and of the OLPC entities 24, the uplink OLPC controller 25 is then able to calculate values for the Eb/No of a specific transport channel. When $DCH_{Active}$ is the transport channel associated with the currently active OLPC entity, the uplink OLPC controller 25 can determine an average Eb/No for this transport channel as follows:

$$Av.EbNo_{DCH,Active} = \frac{\sum_{EbNoSlidingWindow} EbNo_{DCH,Active}}{EbNoSlidingWindow},$$

where $$EbNo_{DCH,Active} =$$

$$\frac{\sum_{ReportingPeriod} 10 \frac{SIR_{Actual}^{UL,DPCCH} - 10\log\left(\frac{R_{DCH,Active}^{user}}{N_{eff} \cdot R_{DPDCH}^{DCH,Active}}\right) - 20\log\left(\frac{\beta_c^{TFC_{DCH,Active}}}{\beta_d^{TFC_{DCH,Active}}}\right) - 10\log\left(\frac{SF_{DPCCH}}{SF_{DPDCH}^{DCH,Active}}\right)}{10}}{ReportingPeriod}$$

and $N_{eff}$ can be equal to N or $$N + \left(\frac{\beta_c^{TFC_{Max}}}{\beta_d^{TFC_{Max}}}\right)^2$$

if the DPCCH overhead is included in the Eb/No computation, where N as already above specified is the number of DPDCHs employed in the uplink transmission.

Further a BLER can be determined for the active transport channel $DCH_{Active}$ by:

$$BLER_{DCH,Active} = \frac{\sum_{BLERSlidingWindow} BLER_{DCH,Active}}{BLERSlidingWindow},$$

where $$BLER_{DCH,Active} = \frac{\sum_{ReportingPeriod} CRC\_NOK}{\sum_{ReportingPeriod} (CRC\_OK + CRC\_NOK)}.$$

In addition or alternatively, also a BER can be determined for the active transport channel $DCH_{Active}$ by:

$$BER_{DCH,Active} = \frac{\sum_{BERSlidingWindow} BER_{DCH,Active}}{BERSlidingWindow},$$

where $$BER_{DCH,Active} = \frac{\sum_{ReportingPeriod} QE}{NofQEperReprtingPeriod}.$$

The BER computation is only possible, however, when turbo coding is used.

Since each activity report includes an information on whether the respective entity 24 has been active during the last reporting period, the OLPC controller 25 is able to reset the quality and Eb/No computations carried out for one entity any time one of the respective other entities has experienced traffic within the preceding reporting period, i.e. if it has not been in DTX mode over the entire reporting period.

Furthermore, the sliding window content for quality computations shall be reset when the target SIR is changed and thus sent to the WCDMA node B 21.

Based on MCC start/stop measurement commands, it is possible to update the RRC connection based counters cell by cell and traffic class based, since the MCC is aware of the cell participating in diversity handover (DHO). Furthermore, for each traffic class, i.e. TrCH, within the same RRC connection, the uplink OLPC controller 25 shall update each reporting period the following counters, when receiving a Start Measurements Command form the MCC: the determined average Eb/No in linear, the determined BLER, the determined BER, the total number of CRC OK, and the total number of CRC NOK.

If the MCC needs OLPC data from a specific radio connection for online and/or trace, i.e. if the online and/or trace parameter has been set to 'Y', the counters are delivered to the MCC together with the actual CFN every counters update period.

Upon receiving the stop measurements command, the uplink OLPC controller 25 sends the collected counters to the MCC and resets the sliding window contents. The same actions are taken by the OLPC controller 25 when it receives the RRC connection release command from the MCC, when the relocation of the serving RNC (SRNC) is executed, or when a handover to another system or frequency is triggered off. Also if a DCH is released and a RAB reconfiguration is carried out, within the current RRC connection, the counters corresponding to this bearer service are sent to the MCC.

The invention claimed is:

1. Method for determining cell based values varying in time of at least one parameter of a selected active uplink transport channel multiplexed with at least one other transport channel to a dedicated physical channel, said method comprising in a unit receiving said uplink transport channels:
    computing in predetermined periods of time a value for said at least one parameter of said selected uplink transport channel based on the value of at least one available parameter associated to said dedicated physical channel, the value of which at least one available parameter is influenced by signals transmitted on all active uplink transport channels multiplexed to said dedicated physical channel;
    determining for said predetermined periods of time for each of said uplink transport channels whether it is active in the respective period of time; and
    excluding periods of time for which it was determined that any other than said selected transport channel was active from supplying a valid value for said at least one parameter of said selected active uplink transport channel.

2. Method according to claim 1, wherein said at least one parameter of a selected active uplink transport channel comprises the bit energy per noise interference (Eb/No) of said selected active uplink transport channel.

3. Method according to claim 2, wherein said at least one available parameter associated to said dedicated physical channel comprises a target signal-to-interference ratio (SIR) which is determined proceeding from a predetermined value and changed according to requirements of each of said uplink transport channels multiplexed to said dedicated physical channel.

4. Method according to claim 1, wherein said at least one parameter of a selected active uplink transport channel comprises the block error rate (BLER) of said selected active uplink transport channel.

5. Method according to claim 4, wherein said at least one available parameter associated to said dedicated physical channel comprises a block error rate (BLER) determined for said dedicated physical channel to which a plurality of transport channels are multiplexed.

6. Method according to claim 1, wherein said at least one parameter of a selected active uplink transport channel comprises the bit error rate (BER) of said selected active uplink transport channel.

7. Method according to claim 6, wherein said at least one available parameter associated to said dedicated physical channel comprises a bit error rate (BER) determined for said dedicated physical channel to which a plurality of transport channels are multiplexed.

8. Method according to claim 1, wherein values for said at least one parameter are determined for each of said uplink transport channels multiplexed to said dedicated physical channel.

9. Method according to claim 1, wherein said values for said at least one parameter of an uplink transport channels are determined as average values for each period of time.

10. Method according to claim 1, wherein values of said at least one parameter are determined for several periods of time, which values are subjected to a sliding average within a predetermined sliding window.

11. Method according to claim 1, wherein determined values for said at least one parameter are stored in a data base.

12. Method according to claim 1, wherein said dedicated physical channel (DPCH) comprises a dedicated physical control channel (DPCCH) and one or more dedicated physical data channels (DPDCH), and wherein for multiplexing said transport channels to said dedicated physical channel each of said transport channels is first multiplexed to a code composite traffic channel (CCTrCH), said code composite traffic channel then being mapped in one or more of said dedicated physical data channels (DPDCHs) of said dedicated physical channel.

13. Method according to claim 1, wherein said at least one parameter of a selected active uplink transport channel is determined in an uplink outer loop power control controller (25) of a radio network controller (RNC) (22), wherein the activity of each transport channel mapped onto said dedicated physical channel is controlled in a dedicated uplink outer loop power control entity (24) of said RNC (22), and wherein said uplink outer loop power control entities (24) provide for each of said periods of time an indication whether the respective transport channel was active during said period of time to said uplink outer loop power control controller (25).

14. Method according to claim 1, wherein cell based values of said at least one parameter of respective selected active uplink transport channels are determined cell by cell for a selected group of cells in units receiving said uplink transport channels, a central unit controlling said cell by cell determination of cell based values and collecting said determined cell based values.

15. Network element (22) for a communications network comprising means (24,25) for determining according to claim 1, wherein said cell based values varying in time of at least one parameter of a selected active uplink transport channel multiplexed with other transport channels to a dedicated physical channel.

16. Network element (22) according to claim 15, which network element (22) is a radio network controller (RNC) for a universal mobile telecommunication system (UMTS) terrestrial radio access network (UTRAN), wherein said means comprise:
   an uplink outer loop power control controller (25) for determining values varying in time of at least one parameter of a selected active uplink transport channel from available values of at least one parameter associated to said dedicated physical channel; and
   a dedicated uplink outer loop power control entity (24) for each of said transport channels, which outer loop power control entities (24) include means for determining whether the respective transport channel is active in predetermined periods of time, and means for providing the uplink outer loop power control controller (25) in regular periods of time with a report indicating whether the respective data channel was active in the preceding period of time.

17. Communications network comprising at least one network element (22) according to claim 15.

18. Communications system comprising a communications network with at least one network element (22) according to claim 15.

* * * * *